United States Patent Office 3,067,197
Patented Dec. 4, 1962

3,067,197
11-OXYGENATED 6α-FLUORO-16-METHYLENE-Δ⁴-PREGNENES AND DERIVATIVES
Eugene J. Agnello, Gerald D. Laubach and Walter T. Moreland, Groton, Conn., assignors to Chas. Pfizer & Co., Inc., Brooklyn, N.Y., a corporation of Delaware
No Drawing. Filed Apr. 26, 1961, Ser. No. 117,379
4 Claims. (Cl. 260—239.55)

This application is concerned with new and useful steroid compounds, intermediates in their preparation and the process by which they are prepared. More particularly, it is concerned with the compound 6α-fluoro-16-methylene-Δ⁴-pregnene-11β,17α,21-triol-3,20-dione and various derivatives thereof, intermediates in their preparation and the process by which they are prepared.

The compounds within the purview of this invention may be represented by the formulas

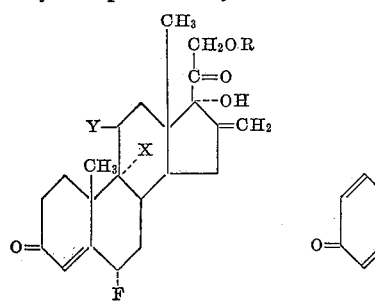
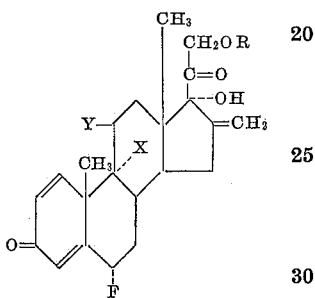
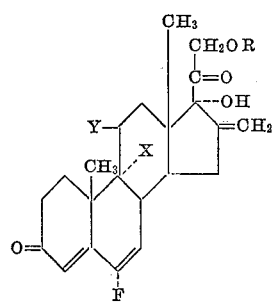
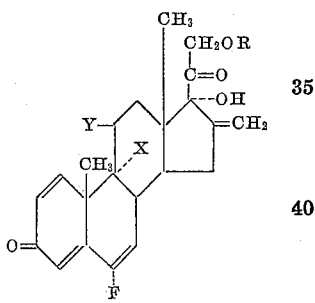

wherein X is hydrogen, bromine, or fluorine; Y is keto or β-hydroxyl and R is hydrogen or an acyl hydrocarbon group containing only carbon, hydrogen, and oxygen up to a total of ten carbon atoms.

Compounds of this invention are prepared by the following sequence of reactions using 6α-fluoro-16-methylene-Δ⁴-pregnene-17α,21-diol-3,20-dione as a starting compound. The preparation of this compound is described and claimed in co-pending and concurrently filed patent application, Serial Number 105,576.

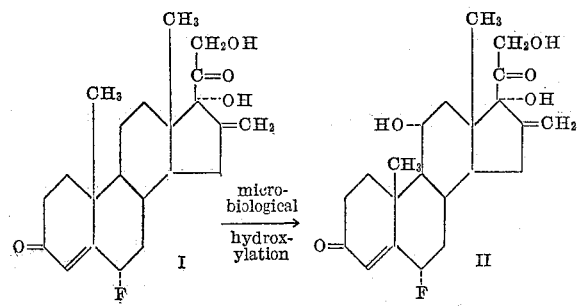

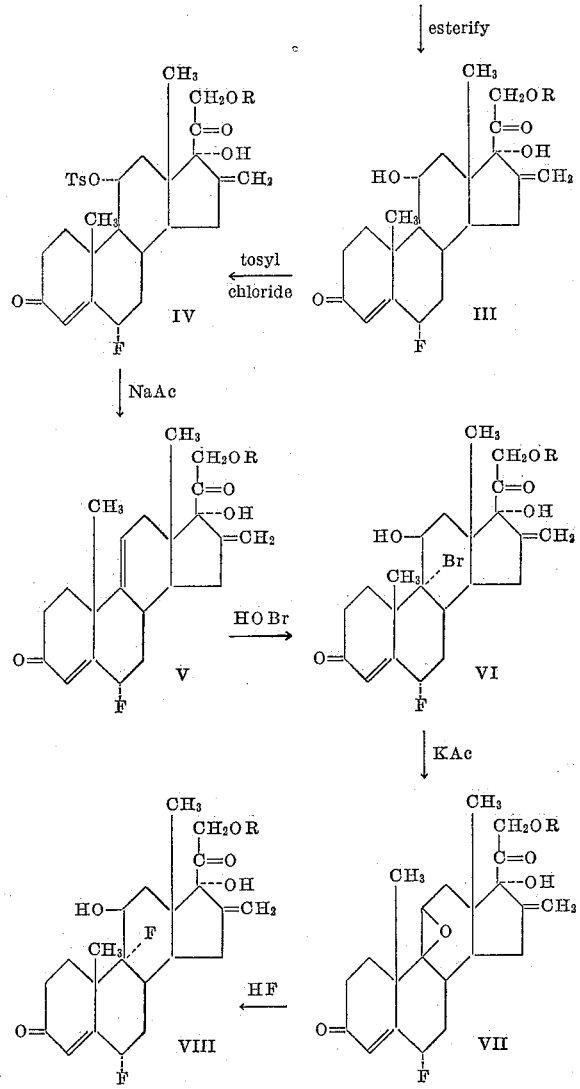

In the first step of this reaction, the starting compound is hydroxylated at the 11-position. This is accomplished microbiologically and the hydroxyl group introduced may be either the α or the β configuration. A number of organisms are known in the art as capable of effecting this hydroxylation. For example, the organism, *Rhizopus nigricans*, can be employed to produce an 11α-hydroxy compound in accordance with the procedure of Peterson et al. described in the Journal of the American Chemical Society, vol. 74, page 5933 (1952). Compounds with an 11β-hydroxyl group can be prepared using, for example, *Curvularia lunata* according to the procedure described and claimed in U.S. Patent 2,658,023 issued November 3, 1953. Organisms of the genus *Chaetomella*, *Spondylocladium* or *Epicoccum* can also be used to prepare 11β-hydroxylated steroids in accordance with the procedures described and claimed in U.S. Patents 2,882,205, 2,876,170 and 2,875,134 respectively. Other organisms which will introduce hydroxyl groups in either the α-configuration or the β-configuration at the 11-position are well known. As is well known, 21-esters may be used as substrates for this reaction. It is preferred, however, to use 21-alcohols since most microorganisms hydrolyze the ester group during the course of the introduction of the hydroxyl.

The compounds prepared by this process are new and useful. They are included within the scope of this invention. The compound 6α-fluoro-16-methylene-Δ⁴-pregnene-11β,17α-21-triol-3,20-dione is therapeutically useful and is also a useful intermediate. The corresponding 11α-hydroxy compound is useful as an intermediate. Both of these compounds can be converted to $\Delta^{1,4}$-, $\Delta^{4,6}$-, or $\Delta^{1,4,6}$-compounds by procedures described hereinafter.

In the next step of this valuable synthetic sequence, a compound prepared by the procedure of the previous reaction is esterified at the 21-position so as to form a 21-acyl hydrocarbon ester containing only carbon, hydrogen or oxygen up to a total of ten carbon atoms in the ester moiety.

Any of a variety of well known esterification procedures can be used. The ester can be formed by reaction with an acid, an acid anhydride, or an acid halide, preferably a chloride. Reaction is effected in a reaction inert solvent such as pyridine or a hydrocarbon or halogenated hydrocarbon containing up to six carbon atoms. Preferred conditions include the utilization of an acid anhydride or acid chloride, in the presence of an equimolar quantity of a nitrogenous base such as analine pyridine or diethylamine. The function of the base is to neutralize the free acid which is generated in the reaction. One method which is especially preferred is to utilize pyridine as both solvent and nitrogenous base. An excess of esterifying agent is used, suitably from about 10% to about 50% molar excess. The time and temperature of reaction are not critical. At low temperature, a longer reaction time is required. A useful range might be defined as from about 20° C. to about 115° C. for a period of about 1 to about 24 hours.

The product is isolated by removing the solvent in vacuo or other suitable means. It may be purified by recrystallization from a suitable solvent such as acetone-petroleum ether.

Compounds prepared by this process are new and valuable and are included within the scope of this invention.

In the next step in this synthesis, the 11-hydroxylated compound is dehydrated to form a $\Delta^{9(11)}$-compound. This is accomplished by first converting the steroid to an 11-sulfonyloxy compound, i.e., a sulfonate ester and subsequently removing a molecule of a sulfonic acid. The procedure is well known in the art and involves reaction with the appropriate sulfonyl halide. Suitable sulfonyl halides include both arylsulfonyl halides such as p-toluene-sulfonyl chloride or p-bromo-sulfonyl chloride, and alkylsulfonyl halides such as methane or ethanesulfonyl chloride. The preferred reagents are p-toluenesulfonyl chloride and methanesulfonyl chloride. The resulting esters are referred to respectively as tosylates or mesylates. When 11β-hydroxy compounds are used as substrates the $\Delta^{9(11)}$-compound is not isolated. With 11α-hydroxy compounds, the sulfonate ester is stable and can be isolated. It is generally isolated and subsequently decomposed since this decreases possible contamination of the $\Delta^{9(11)}$-compound with unwanted side products.

The sulfonate ester of an 11α-hydroxy steroid is prepared by reacting the steroid in a hydrocarbon or halogenated hydrocarbon solvent containing up to eight carbon atoms or pyridine with at least a molar equivalent and preferably with an excess of from about 10% to about 40% of the selected sulfonyl halide. The reaction takes place in the presence of an alkaline reagent, preferably a nitrogenous base which will not react with the sulfonyl halide. Sufficient base should be employed to neutralize all of the hydrogen halide by-product which forms, although excesses, even up to 1000% or more can be used.

Suitable solvents include, for example, chlorobenzene, toluene, carbon tetrachloride, chloroform, methylene chloride or ethylene chloride, dimethyl aniline, tributyl amine, or pyridine are examples of nitrogenous bases which can be successfully used.

Pyridine is especially useful and is preferred for this reaction, since it can serve both as a solvent and as a base. Occasionally mixed solvent systems are used. Thus, the steroid will be taken up in pyridine and the acid chloride in chloroform. The latter is then added to the pyridine mixture.

The temperature of the recation may vary from about 0° C. to about 40° C. The higher temperatures increase the rate of reaction. It is preferred to carry out the reaction at from about 25° C. to about 40° C. since this temperature range is consistent with a convenient rate of reaction and does not increase the cost of reaction by the necessity of destroying heat energy to attain the low temperature. The time of reaction varies from about 8 to about 60 hours. In the preferred temperature range, the time of reaction will be from about 8 to about 10 hours.

The product is isolated using standard means well known in the art. The reaction mixture may, for example, be quenched in ice water and the desired product isolated by extracting the aqueous mixture with an organic solvent such as one of these mentioned above. Chloroform is especially useful. The organic layer is usually washed with dilute mineral acid to decompose any excess base and then with water. The product is isolated by evaporating the solvent in vacuo, preferably after drying over an anhydrous drying agent such as anhydrous sodium or magnesium sulfate.

The compounds formed by this reaction are new and useful intermediates and are specifically included with the scope of this invention. They are represented by the following formula wherein R′ is acyl hydrocarbon containing up to ten carbon atoms and $R_1$ is mesyl or tosyl.

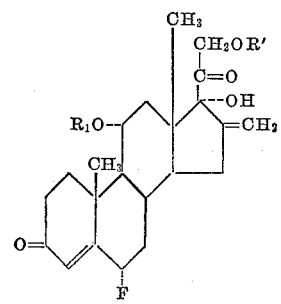

Conversion of the ester to the $\Delta^{9(11)}$-compound is effected by heating the compound together with an alkaline reagent, preferably an alkali metal salt of a lower fatty acid in a substantially anhydrous liquid solvent. Operable salts include sodium acetate, potassium acetate, and sodium or potassium propionate or butyrate. A molar equivalent of alkaline reagent can be used, but it is preferred to use from about a 200 to a 700% molar excess. Suitable solvents include lower fatty acids containing up to four carbon atoms and N-alkyl or N,N-dialkyl amide derivatives of these fatty acids, an alkyl group containing up to two carbon atoms. They include, for example, formic acid, acetic acid, propionic acid, butyric acid, N-methyl formamide, N,N-dimethylformamide, N,N-diethylformamide or N-methyl acetamide. Other reagents capable of effecting the desired result include sodium iodide, potassium iodide or lithium bromide in acetone or a lower fatty acid.

The temperature range for the reaction is from about 30° C. to about 140° C. and the time of reaction is from about 10 minutes to about sixteen hours. The mesylate is more readily decomposed than the tosylate.

The desired product may be isolated either by precipitation with water or by evaporating the solvent in vacuo and washing the residue with water. In a variation of the last procedure, the residue is taken up in an organic solvent such as chloroform; the solvent washed, dried and evaporated. Purification may be effected by recrystallization or trituration.

As stated above, $\Delta^{9(11)}$-compounds are prepared directly from 11β-hydroxy compounds. This is accomplished by reacting the steroid with at least a molar equivalent and preferably with an excess of from about 10% to about 40% of the selected sulfonyl halide in a reaction inert hydrocarbon or halogenated hydrocarbon solvents containing sufficient alkaline reagent, preferably a nitrogenous base which will not react with the sulfonyl halide, to neutralize all of the hydrogen halide byproduct which forms. Obviously, at least equimolar quantities of base should be used, but larger excesses, even up to 1000% molar excess or even higher can be successfully employed. In fact, an excellent procedure is to dispense with the inert solvent and use a nitrogeneous base such as, for example, dimethyl aniline, tributyl amine or pyridine as the solvent. A small amount of dimethylformamide is essential to the reaction. The amount is not critical, but generally at least 10% by weight of this reagent based on the amount of steroid reactant will be employed.

Suitable solvents include, for example, chlorobenzene, toluene, carbon tetrachloride, chloroform, methylene chloride, ethylene chloride or ethers containing up to eight carbon atoms. Mixed solvents, e.g. pyridine and chloroform can be employed.

The temperature of reaction may vary from about $-20°$ C. to about $40°$ C., preferably $-10°$ C. to $25°$ C. The time of reaction varies from about one-half to about 60 hours. In the preferred temperature range, the time of reaction will be from 4 to 20 hours. It may be convenient to initiate reaction at a low temperature and complete it at a higher temperature.

The product may form and precipitate during the course of the reaction. In that event, it can be recovered by filtration, preferably after standing at room temperature for a sufficient time to allow good crystal formation. Best yields are insured, however, by quenching the reaction mixture in ice cold water and recoverying the resulting precipitate.

The compounds prepared by these processes are new and useful intermediates and are included within the scope of this invention. They include 6α-fluoro-16-methylene-$\Delta^{4,9(11)}$-pregnadiene-17α,21-diol-3,20-dione 21-esters wherein the acyl hydrocarbon group contains only carbon, hydrogen and oxygen up to a total of ten carbon atoms.

The $\Delta^{4,9(11)}$-21-acyloxy compound is next converted to a 9α-bromo-11β-hydroxy compound by reaction with hypobromous acid, preferably, generated in situ by treatment of N-bromoacetamide or N-bromosuccinimide with an aqueous solution of a strong acid such as sulfuric, p-toluenesulfonic, trichloroacetic or perchloric acid. The last mentioned of these is preferred. The reaction is preferably carried out in peroxide-free dioxane containing the selected hypobromous acid releasing agent and an aqueous acid. Preferably an excess of hypobromous acid releasing agent of from about 10% to about 25% is employed, although greater or lesser amounts, say from equimolar to about 50% excess can also be used. A mole to mole ratio of strong acid and hypobromous acid releasing agent is used. The resulting reaction is obviously between the steroid and from an equimolar to about a 50% excess of hypobromous acid. The temperature of the reaction is from about 20 to about 40° C. and the duration is from about one-half to about 4 hours.

The product may be isolated by admixing the reaction mixture with water and filtering the resulting precipitate. It is convenient to decompose excess perchloric acid by the addition of sodium sulfite or hyposulfite before precipitation with water. Purification may be accomplished by recrystallization from a suitable solvent such as acetone.

In a preferred embodiment, the $\Delta^{4,9(11)}$-compound is dissolved in peroxide-free dioxane and aqueous perchloric acid is added. Solid N-bromo-acetamide is added and the mixture is kept in the dark at room temperature for one-half hour. The excess perchloric acid is destroyed by the addition of sodium sulfite and the product isolated as described above.

Compounds prepared by this process are therapeutically active and are new and valuable intermediates. They are included within the scope of this invention. They include 6α-fluoro-9α-bromo-16-methylene-$\Delta^4$-pregnene-11β, 17α-21-triol-3,20-dione 21-esters wherein the acyl hydrocarbon group contains only carbon, hydrogen and oxygen up to a total of ten carbon atoms.

The 9α-bromo-11β-hydroxy compound is next converted to a 9β,11β-epoxide. This is accomplished by reaction with sodium or potassium acetate. Other alkaline reagents such as sodium or potassium carbonate and bicarbonate may be used, but these are not preferred since the 21-ester group is hydrolyzed and must be re-esterified. The reaction may be effected in water, or preferably dioxane, or a lower alkanol solvent such as methanol or ethanol at a temperature of from about 20° C. to about 75° C. during a reaction period of from about one to about twenty hours. The higher temperatures favor shorter reaction periods. A solvent mixture can also be used. An equimolar quantity of alkaline reagent can be used, but it is preferred to use a molar excess of from about 10% to about 200%.

The product is recovered by standard means. If water is used, the reaction mixture is extracted with an organic solvent such as methylene chloride or chloroform. If an alkanol or a mixture of water and alkanol is used, the alkanol is removed in vacuo and the residue extracted or taken up in an organic solvent. The desired product is isolated from the organic solution by evaporation of the solvent in vacuo, preferably after drying over an anhydrous drying agent such as sodium or magnesium sulfate.

Compounds prepared by this reaction are new and useful intermediates and are included within the purview of this invention. They include the 21-acyl hydrocarbon esters of 6α-fluoro-9β,11β-epoxido-16-methylene-$\Delta^4$-pregnene-17α,21-diol-3,20-dione wherein the acyl hydrocarbon group contains up to ten carbon atoms.

Conversion of the epoxide to a 9α-fluoro-11β-hydroxyl compound is effected by the action of anhydrous hydrogen fluoride in the presence of an organic proton acceptor such as a lower alkanol containing up to three carbon atoms, dioxane or tetrahydrofuran. The last mentioned of these reagents is preferred. Suitable solvents for carrying out the reaction include hydrocarbon and halogenated hydrocarbon solvents containing up to eight carbon atoms such as benzene, chlorobenzene, hexane, octane, carbon tetrachloride, methylene chloride, ethylene chloride and chloroform. The reaction is carried out at a temperature of from about $-70°$ C. to about $30°$ C. With $\Delta^4$-compounds, lower temperatures within this range, say from $-70°$ C. to $0°$ C. are preferred. With $\Delta^{1,4}$-compounds, the preferred temperature range is from about $-15°$ C. to about $25°$ C. The duration of the reaction is from about 4 to about 20 hours. An excess of hydrogen fluoride is used. The amount of the excess is not critical and may vary from 100% or less to as high as 800% or even more.

The product is isolated, for example, by admixture with dilute aqueous alkaline reagent such as aqueous sodium bicarbonate or potassium bicarbonate, containing enough base to neutralize the acid. Extraction of the mixture with an organic solvent such as chloroform followed by washing with water, drying over an anhydrous reagent such as sodium sulfate, filtration, and removal of the solvent yields the desired product. The product may be further purified by recrystallization from a suitable solvent such as ethyl acetate.

In a preferred method, a reaction mixture containing a molar ratio of anhydrous hydrogen fluoride to tetrahydrofuran of from about 1.7:1 to about 4:1 is pre-cooled to the desired temperature and a pre-cooled steroid solution of steroid in chloroform is added. The mixture is allowed to stand at the selected temperature for about 4 hours and then isolated.

Compounds within the purview of this invention having a double bond at the 1,2-position can be prepared chemically or microbiologically.

For the chemical conversion, the compound is treated with selenium dioxide in an inert solvent, i.e., a solvent which is inert to the reagent selenium dioxide, as well as non-injurious to the steriod compound and product. Solvents which are useful for this reaction include, for example, tertiary butanol, tertiary pentanol, benzene, ethylene glycol and various other glycol ethers, phenetole, xylene, dioxane and naphthalene. It will be noted that various high boiling alcohols, ethers and hydrocarbons may be utilized for the reaction.

In carrying out the reaction, it is generally preferred to utilize temperatures of from about 75° C. to about 200° C. for from about 1 hour to about 100 hours. If the solvent that is chosen is not sufficiently high boiling so that the desired elevated temperature, which assures reasonably rapid reaction is obtained, on heating to reflux at atmospheric pressure, then the mixture of solvent, steroid and selenium dioxide is subjected to elevated pressures so that the desired elevated temperatures can be realized.

From one to ten molar equivalents of selenium dioxide are employed and they may be added in several different portions during the course of the reaction.

Preferred conditions include the addition of a lower fatty acid such as acetic acid to a tertiary butanol mixture.

The product is isolated in accordance with standard means after filtering the reaction mixture to remove solid residual material. The mixture may be simply evaporated in vacuo to leave the desired product as a residue which is then purified by recrystallization or chromatography. Alternatively, the filtrate may be washed with various reagents designed to remove residual impurities before it is evaporated. This procedure is illustrated in the examples.

If a microbiological method is selected for introducing the double bond at the 1,2-position, a number of organisms are available. There may be mentioned by way of example, *Corynebacterium simplex* as described by Bernstein et al. in the Journal of the American Chemical Society, 78, 5693 (1956), and organisms of the genus Mycobacterium as described in U.S. Patent 2,905,592 issued on September 22, 1959. Particularly useful are organisms of the genus Nocardia including, for example *Nocardia opaca* ATCC 4276 and *Nocardia globerula* ATCC 9356. The steroid is subjected to the oxidizing, that is, the dehydrogenating activity of the selected organism. There are several procedures which may be used for the dehydrogenation. In the first of these, nutrient media are seeded with slants of the selected organism. Such a medium may consist, for example, of a mixture of standard bacteriological nutrient broth base, together with added carbohydrate. The cultivation of the various organisms in accordance with this procedure has been described in considerable detail in many publications. The seeded, sterile, nutrient solutions may be grown in shake flasks for two to three days to provide inoculum for larger vessels and in turn, the larger, stirred, aerated vessels may be used for the inoculation of full production scale vessels for submerged fermentation. The same medium of the type described above may be used for the large scale dehydrogenation of steroids according to this process. Considerable variation may, of course, be made in the medium. In general, there is required a carbohydrate, a source of organic nitrogen, mineral salts and various trace metals.

Rather than conducting the dehydrogenation in the presence of the whole fermentation broth, the cells may be removed from growing cultures and these may be resuspended in a medium which is designated the enzyme reaction mixture. Such a mixture may consist, for example, of a solution which is 0.01 molar in sodium fumarate or other hydrogen acceptor or in magnesium sulfate and 0.03 molar in sodium citrate. The presence of a certain amount of adenosine triphosphate, for example, 0.125% is also quite useful. Centrifuged, washed cells of the chosen organism may be suspended in this type of reaction mixture which is adjusted to a pH of about 6, for example, with citric acid. After addition of the steroid compound which it is desired to oxidize, the mixture may be incubated at about 37° C. and samples may be removed from time to time to determine the point at which maximum conversion of the steroid has taken place. In general, this occurs after about one to several days. The cells from about 100 ml. of the stirred, aerated cultures may be suspended in about 20 ml. of an enzyme reaction mixture for suitable results. Considerable variation may be made in these proportions. The steroid compound may be used in a proportion of about 25 to about 200 mg./ml. of the enzyme reaction mixture. The compound in solid form is merely added to the medium after adjustment of the pH. The flasks are stoppered with cotton so that they are exposed to the air during the incubation. It is preferred to use a small volume compared to the volume of the flask, for example, 20 ml. in a 125 ml. Erlenmeyer flask. Alternatively, the mixture may be stirred and aerated. In general, a hydrogen acceptor, a divalent metal, particularly magnesium and a buffer are required in the medium.

Rather than removing the cells and carrying out the reaction in an enzyme reaction mixture, the steroid compound may be added directly to a sterilized portion of the nutrient medium such as is described above and the medium is then seeded with the chosen organism. Approximately, the same proportion of chosen steroid compound may be used in this case also. Samples of the agitated aerated mixture may be removed at intervals for determination of the conversion of the steroid compound to the oxidized products. The mixture is maintained at between 20° C. and 37° C. or higher during the growth of the cells and the conversion of the steroid. In general, about one-half to seven days are required for maximum production of the dehydrogenated compounds. Alternatively, the growth of cells may be established before the addition of the steroid.

A third method which is also very useful for the dehydrogenation of the substrate involves the use of oxidizing enzymes produced by the organism. These may be prepared by a variety of methods from the cells of the organism. These materials may be released from the cells by different procedures. These include grinding, particularly with abrasive materials such as powdered glass or sand which serves to break the cell walls and release the essential materials. A second method is by autolysis. The cells may be removed from the medium in which they are grown. They are then washed and suspended in water. The water may be covered with a thin layer of toluene to prevent contamination, and the mixture is allowed to stand at a temperature of from about 20° C. to about 50° C. The cells disintegrate within one to several days and the cell residue may be removed by filtration, for example, through a Seitz filter or through a sintered glass bacterial filter. A third method for preparing cell-free elaboration products of an organism used for dehydrogenation is by repeated, rapid freezing and thawing of the cellular material. Another method is by the use of ultrasonic energy to rupture the cells. One further method of use for the same purpose is by the use of a water miscible solvent, particularly acetone. The cells when placed in such a solvent are ruptured and an extract of the desired enzymes is obtained. The enzymes may be used for dehydrogenation in media similar to those used with the grown cells, that is, one containing a hydrogen acceptor such as fumarate, a buffer and in some cases, a bivalent metal, particularly, magnesium as well as a minor proportion of adenosine triphosphate. The cell-free oxidizing enzymes of the organism may be used in media indicated above at a temperature of about 20° C. to about 40° C. In general, the oxidation of the desired steroid compound is brought about in a period of from a few hours to several days. The optimum time and temperature and other conditions may readily be determined by a minimum of experimentation. Detailed descriptions of suitable media for both the use of isolated, resuspended cells and of cell-free elaboration products are given in the textbooks Manometric Techniques in Tissue Metabolism by W. W. Umbreit et al., Burgess Publishing Company, Minneapolis (1949), and Respiratory Enzymes by H. Lardy, Burgess Publishing Company, Minneapolis (1949).

The use of this process in connection with dehydrogenations using organisms of the genus Nocardia is described in detail in copending patent application Serial No. 538,514, filed October 4, 1955.

The products may be isolated by known methods, for example, by extraction with various water immiscible organic solvents. Lower halogenated hydrocarbons such as chloroform are particularly useful. After extraction, the solvent may be removed by distillation and the solid product then isolated. Further purification may be effected by recrystallization from suitable organic solvents, for example, ethyl acetate. Chromatographic methods employing paper, alumina or other suitable solid absorbent materials can also be used.

Reference is made above to the use of various 11-hydroxylating organisms in the course of this invention. The procedures set forth in detail for dehydrogenation are also useful for hydroxylating. For the reaction, the steroid compound is contacted with the oxygenating activity of the selected microorganism to introduce the hydroxyl group in accordance with one of the procedures set forth above. In both cases, it is preferred to use 21-hydroxy compounds as substrates since the organism almost invariably hydrolyzes a 21-ester.

Compounds within the purview of this invention having a double bond in the 6,7-position are prepared by contacting the corresponding 3-keto-6,7-dihydro-$\Delta^4$-steroid compound with a quinone having an oxidation-reduction potential less than —0.5 at an elevated temperature between about 70° C. and 190° C. in an inert organic solvent having a boiling point of at least about 70° C. and selected from the group consisting of mononuclear aromatic hydrocarbons, mononuclear halogenated aromatic hydrocarbons, oxygenated polar aliphatic organic solvents and oxygenated polar alicyclic organic solvents. Suitable solvents include tertiary butanol, n-amyl alcohol, hexanol, isoamyl alcohol, heptanol, 3-cyclohexanol, orthodichlorobenzene, xylene, tertiary amyl alcohol, secondary amyl alcohol, benzene, toluene, acetic acid, propionic acid, butyric acid, butyl acetate, amyl acetate, hexyl acetate, butyl propionate, propyl propionate, and amyl propionate.

The product formed by this dehydrogenation reaction may be isolated from the resulting solvent solution by various methods. Most conveniently, the solvent may be removed by evaporation under vacuum and the solid product then isolated from the residue. Alternatively, a solvent having a somewhat lower boiling point in which the product is soluble, for example, chloroform, methylene chloride, carbon tetrachloride and so forth may be added. The mixture may then be washed with an aqueous solution of a reducing agent such as sodium bisulfite, and then with dilute sodium hydroxide to remove the reduction product of the quinone. The solvent solution is then dried over an anhydrous drying agent such as sodium sulfate, filtered and the desired product recovered by removing the solvent in vacuo.

As stated above, it is intended to include within the purview of this invention compounds in which the hydroxyl group at the 11-position is replaced with an 11-keto group. These compounds are prepared by oxidation of the 11-hydroxylated substrate.

The choice of oxidizing agent is not critical although it is preferred to use chromic acid in accordance with standard procedures. One procedure which is especially effective is to use 8N chromic acid prepared by dissolving 66.7 g. of chromic acid in a minimum of water and adding 53.3 ml. of concentrated sulfuric acid. The mixture is then made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be used.

Those skilled in the art will recognize that various modifications of the basic procedure described herein are possible. For example, the foregoing describes a reaction sequence in which a double bond is introduced at the 1,2-position before introduction of the double bond at the 6,7-position. This procedure can be reversed. It is also, of course, possible to introduce double bonds at the 1,2-position and 6,7-position after the 11-hydroxyl group has been oxidized. These dehydrogenations can also be carried out in either order.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The following examples are given solely for the purpose of illustration and are not to be construed as limitations of this invention, many apparent variations of which are possible without departing from the spirit or scope thereof.

EXAMPLE I

6α-Fluoro-16-Methylene-$\Delta^4$-Pregnene-11α,17α,21-Triol-3,20-Dione

A culture of *Rhizopus nigricans* Enrb. ATCC 6227b was propagated on an agar nutrient medium. The organism was rinsed from the agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water adjusted to pH 7.0 with potassium hydroxide.

One hundred ml. of this medium were used in each of several 300 ml. flasks. To each flask was added 50 mg. of 6α-fluoro-16-methylene-Δ$^4$-pregnene-17α,21-diol-3,20-dione 21-acetate dissolved in a small volume of acetone. Throughout these operations, the fermentation mixture was maintained under aseptic conditions. The mixture was shaken for a period of seven days at a temperature of about 28° C. The contents of the flasks were combined and extracted with several portions of methylene chloride using ⅕ the volume of aqueous phase each time. The combined methylene chloride extracts were dried over anhydrous sodium sulfate and after the drying agent was removed, the solution was concentrated to a volume of approximately 2 ml. The concentrate was placed on a chromatographic column consisting of silica gel mixed with a small volume of ethanol (1 ml. of solvent per gram of silica gel). The column was developed by means of a mixture of 97 volumes of methylene chloride and 3 volumes of 95% ethanol. The effluent from the column was collected in small fractions of equal volume and periodically these were examined by means of paper chromatography in order to separate the fractions containing the desired product. All of these fractions were combined and concentrated in vacuo to dryness to obtain the desired product.

The compound, 6α-fluoro-16-methylene-Δ$^4$-pregnene-11β,17α,21-triol-3,20-dione was similarly prepared from the 6α-fluoro-16-methylene-Δ$^4$-pregnene-17α,21-diol-3,20-dione using *Curvularia lunata* NRRL 2380.

The compound, 6α-fluoro-16-methylene-Δ$^4$-pregnene-11α,17α,21-triol-3,20-dione was prepared in a similar manner using *Rhizopus nigricans* Ehrb. ATCC 6227b. The starting compound was 6α-fluoro-16-methylene-Δ$^4$-pregnene-17α,21-diol-3,20-dione-21-acetate.

The compound, 6α-fluoro-16-methylene-Δ$^4$-pregnene-11β,17α,21-triol-3,20-dione was prepared in a similar manner from the 6α-fluoro-16-methylene-Δ$^4$-pregnene-17α,21-diol-3,20-dione using *Chaetomella oblonga* ATCC 12718.

The compound, 6α-fluoro-16-methylene-Δ$^4$-pregnene-11β,17α,21-triol-3,20-dione was prepared in a similar manner from 6α-fluoro-16-methylene-Δ$^4$-pregnene-17α,21-diol-3,20-dione-21-propionate using *Spondylocladium australe* ATCC 12728.

The compound, 6α-fluoro-16-methylene-Δ$^4$-pregnene-11β,17α,21-triol-3,20-dione was prepared in a similar manner from 6α-fluoro-16-methylene-Δ$^4$-pregnene-17α,21-diol-3,20-dione using *Epicoccum oryzae* ATCC 12724.

EXAMPLE II

*6α-Fluoro-16-Methylene-Δ$^4$-Pregnene-11β,17α,21-Triol-3,20-Dione-21-Acetate*

A total of 5 g. of 6α-fluoro-16-methylene-Δ$^4$-pregnene-11β,17α,21-triol-3,20-dione was taken up in 50 ml. of pyridine and a 10% molar excess of acetic anhydride was added. It was allowed to stand at 20° C. for 24 hours. It was then evaporated to dryness and the residue taken up in 50 ml. of chloroform. The chloroform solution was washed twice with 50 ml. portions of water, the organic layer separated, dried over anhydrous magnesium sulfate, filtered, and the desired product recovered by removing the solvent in vacuo.

EXAMPLE III

*6α-Fluoro-16-Methylene-Δ$^4$-Pregnene-11β,17α,21-Triol-3,20-Dione-21-Decanoate*

A total of 5 g. of 6α-fluoro-16-methylene-Δ$^4$-pregnene-11β,17α,21-triol-3,20-dione was taken up in 100 ml. of benzene containing a 50% molar excess of aniline and a 50% molar excess of decanoyl chloride was added. The mixture was refluxed for 3 hours, washed twice with equal volumes of water and twice with equal volumes of 10% aqueous sodium hydroxide. The organic layer was dried over anhydrous sodium sulfate, filtered and the desired product recovered by removal of the solvent in vacuo.

EXAMPLE IV

*6α-Fluoro-16-Methylene-Δ$^4$-Pregnene-11α,17α,21-Triol-3,20-Dione-21-Propionate*

A total of 5 g. of 6α-fluoro-16-methylene-Δ$^4$-pregnene-11α,17α,21-triol-3,20-dione was taken up in 50 ml. of ethylene dichloride containing a 10% molar excess of pyridine. To this mixture there was added a 10% molar excess of propionic anhydride and the mixture was allowed to stand at 20° C. for 16 hours. The mixture was evaporated to dryness and the residue washed with 5% aqueous sodium carbonate. The residue was taken up in 50 ml. of methylene chloride, washed twice with 50 ml. portions of water, dried over anhydrous sodium sulfate, filtered and the desired product recovered by removal of the solvent in vacuo.

EXAMPLE V

*6α-Fluoro-16-Methylene-Δ$^4$-Pregnene-11α,17α,21-Triol-3,20-Dione-21-Butyrate*

A mixture containing 5 g. of 6α-fluoro-16-methylene-Δ$^4$-pregnene-11α,17α,21-triol-3,20-dione together with a 10% molar excess of butyryl chloride in 100 ml. in pyridine was refluxed for 2 hours. The solvent was removed in vacuo and the residue taken up in 50 ml. of methylene chloride. The organic solution was washed twice with 50 ml. portions of 5% aqueous sodium carbonate, and then with a 50 ml. portion of water. It was dried over anhydrous sodium sulfate, filtered and the desired product recovered by removal of the solvent in vacuo.

EXAMPLE VI

*6α-Fluoro-16-Methylene-Δ$^4$-Pregnene-11α,17α,21-Triol-3,20-Dione-11-Tosylate*

A total of 19 g. of 6α-fluoro-16-methylene-Δ$^4$-pregnene-11β,17α,21-triol-3,20-dione 21-acetate was taken up in 300 ml. of chloroform containing a molar equivalent of pyridine and a molar equivalent of p-toluenesulfonyl chloride was added drop-wise while maintaining the temperature at 0° C. The mixture was allowed to stand for 60 hours and then a mixture of 200 grams of crushed ice in 1200 ml. of water was added with vigorous stirring. The mixture was extracted with chloroform and the chloroform solution washed first with cold dilute hydrochloric acid, then with dilute sodium bicarbonate and finally with water. It was dried over sodium sulfate, filtered and the solvent removed in vacuo to leave the desired product as a residue.

EXAMPLE VII

*6α-Fluoro-16-Methylene-Δ$^4$-Pregnene-11α,17α,21-Triol-3,20-Dione-11-Mesylate-21-Acetate*

A total of 10 g. of 6α-fluoro-16-methylene-Δ$^4$-pregnene-11α,17α-21-triol-3,20-dione 21-acetate in 400 ml. of chlorobenzene containing a 40% molar excess of pyridine and a 40% excess of methanesulfonyl chloride in 150 ml. of chlorobenzene was added dropwise. The mixture was maintained at approximately 0° C. for 8 hours and quenched in a mixture of ice and water as described above. The desired product was isolated from a methylene chloride extract using the procedure described in Example VI.

EXAMPLE VIII

*6α-Fluoro-16-Methylene-Δ⁴-Pregnene-11α,17α,21-Triol-3,20-Dione-11-Tosylate-21-Butyrate*

A total of 10 g. of 6α-fluoro-16-methylene-Δ⁴-pregnene-11β,17α,21-triol-3,20-dione 21-butyrate in 400 ml. of benzene containing a 40% molar excess of N-methylpiperidine and a 40% excess of p-toluenesulfonyl chloride in 150 ml. of benzene was added dropwise. The mixture was maintained at approximately 0° C. for 50 hours and quenched in a mixture of ice and water as described above. The desired product was isolated from an ethylene chloride extract using the procedure described in Example VI.

EXAMPLE IX

*6α-Fluoro-16-Methylene-Δ⁴-Pregnene-11α,17α,21-Triol-3,20-Dione-11-p-Bromosulfonate 21-Propionate*

A total of 10 g. of 6α-fluoro-16-methylene-Δ⁴-pregnene-11α,17α,21-triol-3,20-dione 21-propionate in 400 ml. of carbon tetrachloride containing a 10% molar excess of pyridine and a 40% excess of p-bromosulfonyl chloride in 150 ml. of carbon tetracycline was added dropwise. The mixture was maintained at approximately 40° C. for 8 hours and quenched in a mixture of ice and water as described above. The desired product was isolated from a carbon tetrachloride extract using the procedure described in Example VI.

EXAMPLE X

*6α-Fluoro-16-Methylene-Δ⁴-Pregnene-11α,17α,21-Triol-3,20-Dione-11-Ethanesulfonate 21-Decanoate*

A total of 10 g. of 6α-fluoro-16-methylene-Δ⁴-pregnene-11α,17α,21-triol-3,20-dione 21-decanoate in 400 ml. of chlorobenzene containing a 40% molar excess of dimethylaniline and a 40% excess of ethanesulfonyl chloride in 150 ml. of chlorobenzene was added dropwise. The mixture was maintained at approximately 0° C. for 8 hours and quenched in a mixture of ice and water as described above. The desired product was isolated from a methylene chloride extract using the procedure described in Example VI.

EXAMPLE XI

*6α-Fluoro-16-Methylene-Δ⁴,⁹⁽¹¹⁾-Pregnadiene-17α,21-Diol-3,20-Dione 21-Acetate*

A total of 4.8 g. of 6α-fluoro-16-methylene-Δ⁴-pregnene-11α,17α,21-triol-3,20-dione - 11 - tosylate 21-acetate was taken up in 125 ml. of acetic acid containing 6.5 grams of sodium acetate and the resulting mixture was refluxed for 45 minutes. After cooling, 600 ml. of water was added and the desired product precipitated. It was collected by filtration.

EXAMPLE XII

*6α-Fluoro-16-Methylene-Δ⁴,⁹⁽¹¹⁾-Pregnadiene-17α,21-Diol-3,20-Dione 21-Propionate*

A total of 5 g. of 6α-fluoro-16-methylene-Δ⁴-pregnene-11α,17α,21-triol-3,20-dione-11-tosylate 21-propionate was taken up in 125 ml. of propionic acid containing an equimolar portion of sodium propionate and the mixture was refluxed for ten minutes. After cooling, water was added and the desired product precipitated. It was collected by filtration.

EXAMPLE XIII

*6α-Fluoro-16-Methylene-Δ⁴,⁹⁽¹¹⁾-Pregnadiene-17α,21-Diol-3,20-Dione 21-Acetate*

A total of 10 g. of 6α-fluoro-16-methylene-Δ⁴-pregnene-11α,17α,21-triol-3,20-dione-11-mesylate 21-acetate was taken up in 125 ml. of N,N-dimethyl formamide containing a 700% molar excess of anhydrous sodium butyrate and maintained at 140° C. for 4 hours. After cooling, the desired product was precipitated by the addition of water and was collected by filtration.

EXAMPLE XIV

*6α-Fluoro-16-Methylene-Δ⁴,⁹⁽¹¹⁾-Pregnadiene-17α,21-Diol-3-20-Dione 21-Acetate*

A total of 5 g. of 6α-fluoro-16-methylene-Δ⁴-pregnene-11α,17α,21-triol-3,20-dione-11-p-bromosulfonate 21-acetate was taken up in 125 ml. of acetic acid and refluxed for ten hours. Most of the acetic acid was removed by distillation in vacuo and the residue was taken up in chloroform and extracted with water. The organic layer was washed with dilute sodium bicarbonate and again with water. It was dried over anhydrous sodium sulfate, filtered and the desired product obtained by evaporation of the solvent in vacuo.

EXAMPLE XV

*6α-Fluoro-16-Methylene-Δ⁴,⁹⁽¹¹⁾-Pregnadiene-17α,21-Diol-3-20-Dione 21-Acetate*

A total of 5 g. of 6α-fluoro-16-methylene-Δ⁴-pregnene-11α,17α,21-triol-3,20-dione-11-ethanesulfonate 21-acetate was taken up in 125 ml. of acetic acid and the reaction mixture maintained at 30° C. for 16 hours. The desired product was precipitated by the addition of water and collected by filtration.

EXAMPLE XVI

*6α-Fluoro-16-Methylene-Δ⁴,⁹⁽¹¹⁾-Pregnadiene-17α,21-Diol-3,20-Dione 21-Propionate*

A solution containing 5 g. of 6α-fluoro-16-methylene-Δ⁴-pregnene-11β,17α,21-triol-3,20-dione 21-propionate in 25 ml. of dimethylformamide was prepared. The solution was placed in a three-necked flask to which was affixed a sealed stirrer, dropping funnel and a condenser. The condenser and dropping funnel were protected with drying tubes. The mixture was cooled to −20° C. and a solution containing 4.6 ml. of methanesulfonyl chloride in 5 ml. of pyridine was added dropwise over a period of 1 hour with continued stirring. At the end of the hour, stirring was stopped, the reaction mixture allowed to come to room temperature, i.e., 25 to 30° C., and left standing for 10 hours. At the end of this period, the solution was added dropwise to 750 ml. of ice cold water with stirring. The desired product precipitated and was recovered by filtration.

EXAMPLE XVII

*6α-Fluoro-16-Methylene-Δ⁴,⁹⁽¹¹⁾-Pregnadiene-17α,21-Diol-3-20-Dione 21-Acetate*

A solution containing 0.5 g. of 6α-fluoro-16-methylene-Δ⁴-pregnene-11β,17α,21-triol-3,20-dione 21-acetate was dissolved in 2.5 ml. of pyridine containing 50 mg. of dimethylformamide. The solution was cooled to −20° C. and another solution containing an equimolar portion of methane sulfonyl chloride in 0.5 ml. of pyridine was added. The mixture was stirred at this temperature for ½ hour during which time a precipitate appeared. The reaction mixture was allowed to warm spontaneously to room temperature and was left standing for 16 hours. It was then poured into approximately 50 ml. of ice cold water. The desired product precipitated and was collected by filtration.

EXAMPLE XVIII

*6α-Fluoro-16-Methylene-Δ⁴,⁹⁽¹¹⁾-Pregnadiene-17α,21-Diol-3,20-Dione 21-Decanoate*

A solution containing 5 g. of 6α-fluoro-16-methylene-Δ⁴-pregnene-11β,17α,21-triol-3,20-dione 21-decanoate in 50 ml. of chloroform containing 10 g. of dimethylformamide and an equimolar portion of pyridine was prepared. To this mixture, there was added a 40% excess of p-toluene sulfonyl chloride in 50 ml. of chloroform was added and the mixture maintained at 40° for ½ hour.

The solvent was then removed in vacuo and the residue washed with 10% aqueous sodium bicarbonate solution. It was filtered and dried to yield the desired product.

EXAMPLE XIX

$6\alpha$-Fluoro-16-Methylene-$\Delta^{4,9(11)}$-Pregnadiene-17$\alpha$,21-Diol-3-20-Dione 21-Acetate A solution containing 5 g. of 6$\alpha$-fluoro-16-methylene-$\Delta^4$-pregnene-11$\beta$,17$\alpha$,21-triol-3,20-dione 21-acetate in 25 ml. of dimethylformamide was prepared. The solution was placed in a 3-necked flask to which was affixed a sealed stirrer, dropping funnel, and a condenser. The condenser and drop funnel were protected with drying tubes. The mixture was cooled to —20° C. and a 10% molar excess of p-toluene sulfonyl chloride in 10 ml. of dimethylaniline was added drop-wise while maintaining the mixture at this temperature. The reaction mixture was maintained at this temperature with stirring for 60 hours. It was then allowed to warm spontaneously to room temperature, it was quenched with 500 ml. of ice cold water to precipitate the desired product which was recovered by filtration.

EXAMPLE XX

$6\alpha$-Fluoro-9$\alpha$-Bromo-16-Methylene-$\Delta^4$-Pregnene-11$\beta$,17$\alpha$,21-Triol-3,20-Dione 21-Propionate To a suspension of 1 g. of 6$\alpha$-fluoro-16-methylene-$\Delta^{4,9(11)}$-pregnadiene-17$\alpha$,21-diol-3,20-dione 21-propionate in 50 ml. of peroxide-free dioxane containing a 50% molar excess of p-toluene sulfonic acid in 1 N aqueous solution, there was added in the dark with stirring at 25° C., a 50% molar excess of N-bromoacetamide. The mixture was maintained at this temperature for one-half hour and the product precipitated by addition to ice-water. It was recovered by filtration.

EXAMPLE XXI

$6\alpha$-Fluoro-9$\alpha$-Bromo-16-Methylene-$\Delta^4$-Pregnene-11$\beta$,17$\alpha$,21-Triol-3,20-Dione 21-Acetate To a suspension of 1 g. of 6$\alpha$-fluoro-16-methylene-$\Delta^{4,9(11)}$-pregnadiene-17$\alpha$,21-diol-3,20-dione 21-acetate in 50 ml. of peroxide-free dioxane containing a 50% molar excess of trichloro acetic acid in 1 N aqueous solution, there was added in the dark with stirring at 25° C., a 50% molar excess of N-bromoacetamide. The mixture was maintained at this temperature for 4 hours and the product recovered as described in Example XX. The free alcohol was obtained and reacetylated with acetic anhydride and pyridine under the usual conditions.

EXAMPLE XXII

$6\alpha$-Fluoro-9$\alpha$-Bromo-16-Methylene-$\Delta^4$-Pregnene-11$\beta$,17$\alpha$,21-Triol-3,20-Dione 21-Decanoate To a suspension of 500 mg. of 6$\alpha$-fluoro-16-methylene-$\Delta^{4,9(11)}$-pregnadiene-17$\alpha$,21-diol-3,20-dione 21-decanoate in 25 ml. of peroxide-free dioxane and 0.4 ml. of 0.46 N perchloric acid, there was added in the dark at 25° C. with stirring over a one-hour period, 114 mg. of solid N-bromoacetamide. At the end of one hour, all of the starting material had dissolved and 2.5 ml. of sodium sulfite solution was added with stirring. A few grams of ice in 20 ml. of chloroform was added and the layers separated. The organic layer was washed twice with water while maintaining the temperature at about 20° C. by the occasional addition of ice. The organic solution was concentrated in vacuo and acetone was added. The mixture was maintained at a temperature of about 5° C. until crystals formed and the desired product recovered as an alcohol by filtration. It was converted to a decanoate under the conditions.

EXAMPLE XXIII

$6\alpha$-Fluoro-9$\beta$,11$\beta$-Oxido-16-Methylene-$\Delta^4$-Pregnene-17$\alpha$,21-Diol-3,20-Dione 21-Butyrate To a solution of 5 g. of 6$\alpha$-fluoro-9$\alpha$-bromo-16-methylene-$\Delta^4$-pregnene-11$\beta$,17$\alpha$,21-triol-3,20-dione 21-propionate in 200 ml. of dioxane, there was added an equimolar solution of anhydrous potassium acetate in 320 ml. of absolute ethanol. The mixture was refluxed for 1 hour. After cooling in an ice bath, 400 ml. of ice water was added with stirring and the desired product precipitated.

EXAMPLE XXIV

$6\alpha$-Fluoro-9$\beta$,11$\beta$-Oxido-16-Methylene-$\Delta^4$-Pregnene-17$\alpha$,21-Diol-3,20-Dione 21-Acetate A total of 4 g. of 6$\alpha$-fluoro-9$\alpha$-bromo-16-methylene-$\Delta^4$-pregnene-11$\beta$,17$\alpha$,21-triol-3,20-dione 21-acetate was taken up in 100 ml. of water and a 20% molar excess of sodium carbonate was added. The mixture was maintained at 20° C. for 24 hours. At the end of this period, the solution was extracted with methylene chloride. The organic extract was washed twice with water, dried over anhydrous sodium sulfate, filtered and the desired product obtained as an alcohol by removal of the solvent in vacuo. It was reacetylated under the usual conditions.

EXAMPLE XXV

$6\alpha$-Fluoro-9$\beta$,11$\beta$-Oxido-16-Methylene-$\Delta^4$-Pregnene-17$\alpha$,21-Diol-3,20-Dione 21-Valerate A total of 4 g. of 6$\alpha$-fluoro-9$\alpha$-bromo-16-methylene-$\Delta^4$-pregnene-11$\beta$,17$\alpha$,21-triol-3,20-dione 21-valerate in 120 ml. of methanol was prepared and a 10% molar excess of sodium acetate in 200 ml. of methanol was added. The mixture was refluxed for 2 hours and the solvent removed in vacuo. The residue was taken up in chloroform. The chloroform solution was washed twice with water. It was dried over anhydrous sodium sulfate, filtered and the desired product obtained as the alcohol by evaporation of the solvent in vacuo. It was converted to the valerate ester under the usual conditions.

EXAMPLE XXVI

$6\alpha$-Fluoro-9$\beta$,11$\beta$-Oxido-16-Methylene-$\Delta^4$-Pregnene-17$\alpha$,21-Diol-3,20-Dione 21-Octanoate A solution of 4 g. of 6$\alpha$-fluoro-9$\alpha$-bromo-16-methylene-$\Delta^4$-pregnene-11$\beta$,17$\alpha$,21-triol-3,20-dione 21-octanoate in 150 ml. of dioxane was prepared and a 10% molar excess of potassium bicarbonate in 300 ml. of ethanol was added. The mixture was refluxed for 2 hours. The solvent was removed in vacuo and the residue was taken up in ethylene chloride. It was isolated as an alcohol and reacetylated under the usual conditions.

EXAMPLE XXVII

$6\alpha,9\alpha$-Difluoro-16-Methylene-$\Delta^4$-Pregnene-11$\beta$,17$\alpha$,21-Triol-3,20-Dione 21-Acetate To a solution of 0.4 mole of anhydrous hydrogen fluoride and 0.24 mole of tetrahydrofuran in 25 ml. of chloroform chilled to 0° C., there was added a solution of 0.05 mole of 6$\alpha$-fluoro-9$\beta$,11$\beta$-oxido-16-methylene-$\Delta^4$-pregnene-17$\alpha$,21-diol-3,20-dione 21-acetate in 25 ml. of chloroform previously chilled to this same temperature. The mixture was maintained at 0° C. for 20 hours and then allowed to come to room temperature. To the mixture, there was added 50 ml. of 5% aqueous potassium carbonate with constant stirring. The organic layer was separated and the aqueous layer extracted twice with equal volumes of chloroform. The combined organic layers were washed with water, dried over anhydrous sodium sulfate, filtered and the solvent removed in vacuo to leave the desired product.

The foregoing procedure was repeated to prepare the formate, propionate, isobutyrate, hexanoate, and decanoate

EXAMPLE XXVIII

6α,9α-Difluoro-16-Methylene-Δ$^{1,4}$-Pregnadiene-11β,17α,21-Triol-3,20-Dione

A mixture of 0.8 g. of 6α,9α-difluoro-16-methylene-Δ$^4$-pregnene-11β,17α,21-triol-3,20-dione and 0.8 g. of freshly sublimed selenium dioxide in 10 ml. of tert-butanol was heated in a nitrogen atmosphere for 10½ hours at 75° C. The solution was filtered and the desired product precipitated by the addition of water. It was isolated by filtration.

The procedure was repeated with the appropriate substrate to prepare the corresponding 9α-bromo compound.

EXAMPLE XXIX

6α,9α-Difluoro-16-Methylene-Δ$^{1,4}$-Pregnadiene-11β,17α,21-Triol-3,20-Dione 21-Acetate A mixture containing 0.3 g. of 6α,9α-difluoro-16-methylene-Δ$^4$-pregnene-11β,17α,21-triol-3,20-dione 21-acetate and 0.3 ml. of glacial acetic acid in 30 ml. of tert-butanol was prepared. To this mixture there was added 0.2 g. of selenium dioxide and the mixture was refluxed in a nitrogen atmosphere for 3 hours. An additional 0.1 g. of selenium dioxide was added and refluxing was continued for 4 more hours. The mixture was filtered and the filtrate evaporated to dryness in vacuo. The residue was taken up in 25 ml. of ethyl acetate and washed with one 5 ml. portion of water, twice with 5 ml. portions of 5% aqueous of ice cold 15% ammonium sulfide, once with 5 ml. of cold 2 N ammonium hydroxide, once with 5 ml. portions of water. The layers were separated and the organic layer dried over anhydrous sodium sulfate, filtered and evaporated to dryness in vacuo. The residue was triturated with ether and dried in vacuo to obtain the desired product.

The procedure was repeated with the appropriate substrate to prepare the corresponding 9α-bromo compound.

EXAMPLE XXX

6α,9α-Difluoro-16-Methylene-Δ$^{1,4}$-Pregnadiene-11β,17α,21-Triol-3,20-Dione 21-Acetate A mixture containing 0.3 g. of 6α,9α-difluoro-16-methylene-Δ$^4$-pregnene - 11β,17α,21-triol-3,20-dione 21-acetate in 150 ml. of phenetole containing one molar equivalent of selenium dioxide was refluxed for 1 hour. The mixture was cooled and extracted with chloroform. It was filtered through a filter aid and the solvents removed in vacuo. The product was chromatographed on a column of florisil to obtain the purified products. Selected fractions of the eluate were evaporated to obtain crystals. The crystalline product was triturated with ethyl acetate and dried.

The procedure was repeated with the appropriate substrate to prepare the corresponding 9α-bromo compound.

EXAMPLE XXXI

6α,9α-Difluoro-16-Methylene-Δ$^{1,4}$-Pregnadiene-11β,17α,21-Triol-3,20-Dione 21-Butyrate A total of 10 grams of 6α,9α-difluoro-16-methylene-Δ$^4$-pregnene-11β,17α,21-triol-3,20-dione 21-butyrate in 300 ml of dibutyl Cellosolve containing 5 molar equivalents of selenium dioxide was maintained at 175° C. for 1 hour. The product was recovered from the reaction mixture as described in the previously example.

The procedure was repeated with the appropriate substrate to prepare the corresponding 9α-bromo compound.

EXAMPLE XXXII

6α,9α-Difluoro-16-Methylene-Δ$^{1,4}$-Pregnadiene-11β,17α,21-Triol-3,20-Dione 21-Valerate A total of 10 grams of 6α,9α-difluoro-16-methylene-Δ$^4$-pregnene-11β,17α,21-triol-3,20-dione 21-valerate and 10 molar equivalents of selenium dioxide was refluxed in tert-butanol for 100 hours. The mixture was filtered and the desired product recovered by removal of the solvent in vacuo.

The procedure was repeated with the appropriate substrate to prepare the corresponding 9α-bromo compound.

EXAMPLE XXXIII

6α,9α-Difluoro-16-Methylene-Δ$^{1,4}$-Pregnadiene-11β,17α,21-Triol-3,20-Dione 21-Isobutyrate A mixture containing 10 grams of 6α,9α-difluoro-16-methylene-Δ$^4$-pregnene-11β,17α,21-triol-3,20-dione 21-isobutyrate in 200 ml. of xylene containing 5 molar equivalents of selenium dioxide under 3 atmospheres of nitrogen was maintained at 200° C. for 1 hour. The solvent was removed in vacuo and the residue taken up in chloroform. The solution was purified and isolated as described in Example XXX.

The procedure was repeated with the appropriate substrate to prepare the corresponding 9α-bromo compound.

EXAMPLE XXXIV

6α,9α-Difluoro-16-Methylene-Δ$^{1,4}$-Pregnadiene-11β,17α,21-Triol-3,20-Dione

*Mycobacterium phlei* ATCC 354 was transferred from a nutrient agar slant to a Fernbach flask containing 1000 ml. of the following medium:

Nutrient broth (Difco) _____grams__ 8.0
Glycerol _____ml.__ 20
Tween 80 (Atlas Powder Company) _____m__ 0.2
Distilled water to make 1000 ml.

After two days of shaking at 28° C., 100 ml. of the resulting broth was used to inoculate each of four fermentors containing 2000 ml. of the following medium:

| | Grams |
|---|---|
| Ammonium nitrite | 1.0 |
| Potassium acid phosphate | 0.25 |
| Magnesium sulfate heptahydrate | 0.25 |
| Sodium chloride | 0.005 |
| Ferrous sulfate heptahydrate | 0.0001 |
| Calcium carbonate | 5.0 |

Distilled water to make 1000 ml.

At the same time the fermentors were inoculated, 250 mg. of 6α,9α-difluoro-16-methylene-Δ$^4$-pregnene-11β,17α, 21-triol-3,20-dione 21-propionate was added to each vessel. After 24 hours, the fermentations were stopped, the broth combined and extracted with chloroform. The solvent was removed from the chloroform solution to leave the desired product as a residue.

The procedure was repeated with the appropriate substrate to prepare the corresponding 9α-bromo compound.

EXAMPLE XXXV

6α,9α-Difluoro-16-Methylene-Δ$^{1,4}$-Pregnadiene-11β,17α, 21-Triol-3,20-Dione

To a four liter Pyrex glass vessel equipped for conducting submerged aerated fermentation, there was added two liters of the following medium:

| | Grams |
|---|---|
| N–Z Amine B (trademark—Sheffield Farms casein hydrolysate) | 10 |
| Dextrose hydrate | 10 |
| Yeast extract | 5 |
| Calcium carbonate | 1 |

Tap water to make one liter.

The aqueous mixture was sterilized and 0.25 g. of 6α,9α-difluoro-16-methylene-Δ⁴-pregnene-11β,17α,21-triol-3,20-dione was added. The mixture was then seeded with 100 ml. of a culture of *Nocardia opaca* ATCC 4276 grown in a shake flask on a nutrient broth. The mixture was agitated and aerated with sterile air. The whole mixture was then extracted several times with chloroform. The combined extracts were applied to a silica gel chromatography column which was eluted with mixtures of methylene chloride and ethanol. The combined fractions containing the desired product.

The procedure was repeated with the appropriate substrate to prepare the corresponding 9α-bromo compound.

EXAMPLE XXXVI

*6,9α-Difluoro-Δ⁴,⁶-Pregnadiene-11β,17α,21-Triol-3,20-Dione*

A total of 808 mg. of 6α,9α-difluoro-Δ⁴-pregnene-11β,17α,21-triol-3,20-dione and 900 mg. of chloranil were added to 72 ml. of xylene. The mixture was refluxed under an atmosphere of nitrogen for 18 hours. The reaction mixture was then diluted with 150 mg. of chloroform. The solution was washed with an equal volume of 5% sodium hydroxide solution and then with water. It was then dried over anhydrous sodium sulfate, filtered, and the desired product recovered by removal of the solvent in vacuo.

The procedure was repeated with the appropriate substrate to prepare the corresponding 9α-bromo compound.

EXAMPLE XXXVII

*6,9α-Difluoro-Δ¹,⁴,⁶-Pregnatriene-11β,17α,21-Triol-3,20-Dione 21-Acetate*

A total of 3 g. of 6α,9α-difluoro-Δ¹,⁴-pregnadiene-11β,17α,21-triol-3,20-dione in 100 ml. of n-amyl alcohol was refluxed with an equimolar portion of chloranil for 2 hours and the desired product was isolated as described in Example XXXVI.

The procedure was repeated with the appropriate substrate to prepare the corresponding 9α-bromo compound.

EXAMPLE XXXVIII

*6,9α-Difluoro-Δ¹,⁴,⁶-Pregnatriene-11β,17α,21-Triol-3,20-Dione 21-Propionate*

A total of 3 g. of 6α,9α-difluoro-Δ¹,⁴-pregnadiene-11β,17α,21-triol-3,20-dione 21-propionate in 100 ml. of n-hexyl alcohol was refluxed with a 300% molar excess of chloranil for 30 hours and the desired product isolated in accordance with the procedure of Example XXXVI.

The procedure was repeated with the appropriate substrate to prepare the corresponding 9α-bromo compound.

EXAMPLE XXXIX

*6,9α-Difluoro-Δ¹,⁴,⁶-Pregnatriene-11β,17α,21-Triol-3,20-Dione 21-Propionate*

A mixture containing 6,9α-difluoro-Δ⁴,⁶-pregnadiene-11β,17α,21-triol-3,20-dione in methanol was added to shake flasks containing a 24 hour culture of *Corynebacterium simplex* in a nutrient medium of 0.1% Difco yeast extract buffered at pH 7. The mixture was shaken at 28° C. for 24 hours. The whole broth was then extracted with ethylene chloride and the desired product isolated by evaporation of the solvent.

The procedure was repeated with the appropriate substrate to prepare the corresponding 9α-bromo compound.

EXAMPLE XL

*6α-Fluoro-16-Methylene-Δ¹,⁴-Pregnadiene-11β,17α,21-Triol-3,20-Dione 21-Acetate*

A total of 10 grams of 6α-fluoro-16-methylene-Δ⁴-pregnadiene-11β,17α,21-triol-3,20-dione 21-acetate and 10 molar equivalents of selenium dioxide was refluxed in tert-butanol for 100 hours. The mixture was filtered and the desired product recovered by removal of the solvent in vacuo.

The procedure was repeated with the appropriate substrate to prepare the corresponding 9α-bromo compound.

EXAMPLE XLI

*6-Fluoro-16-Methylene-Δ⁴,⁶-Pregnadiene-11β,17α,21-Triol-3,20-Dione 21-Acetate*

A total of 808 mg. of 6α-fluoro-Δ⁴-pregnene-11β,17α,21-triol-3,20-dione and 900 mg. of chloranil were added to 72 ml. of xylene. The mixture was refluxed under an atmosphere of nitrogen for 18 hours. The reaction mixture was then diluted with 150 mg. of chloroform. The solution was washed with an equal volume of 5% sodium hydroxide solution and then with water. It was then dried over anhydrous sodium sulfate, filtered, and the desired product recovered by removal of the solvent in vacuo.

The procedure was repeated with the appropriate substrate to prepare the corresponding 9α-bromo compound.

EXAMPLE XLII

*6-Fluoro-16-Methylene-Δ⁴,⁶-Pregnadiene-17α,21-Diol-3,11,20-Trione 21-Acetate*

A total of 20 g. of 6α-fluoro-16-methylene-Δ⁴,⁶-pregnadiene-11β,17α,21-triol-3,20-dione 21-acetate in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the desired compound. The ketone was collected by filtration, washed with water and air-dried.

This procedure was used to prepare the following compounds:

6α-fluoro-16-methylene-Δ⁴-pregnene-17α,21-diol-3,11,20 trione-21-propionate

6α-fluoro-16-methylene-Δ¹,⁴-pregnadiene-17α21-diol-3,11,20-trione-21-decanoate 6-fluoro-16-methylene-Δ¹,⁴,⁶-pregnatriene-17α,21-diol-3,11,20-trione-21-butyrate 6α,9α-difluoro-16-methylene-Δ⁴-pregnene-17α,21-diol-3,11,20-trione-21-acetate 6α,9α-difluoro-16-methylene-Δ¹,⁴-pregnadiene-17α,21-diol-3,11,20-trione-21-acetate 6,9α-difluoro-16-methylene-Δ⁴,⁶-pregnadiene-17α,21-diol-3,11,20-trione-21-isobutyrate 6,9α-difluoro-16-methylene-Δ¹,⁴,⁶-pregnatriene-17α,21-diol-3,11,20-trione 21-valerate 6α-fluoro-9α-bromo-16-methylene-Δ¹,⁴-pregnadiene-17α,21-diol-3,11,20-trione 21-acetate 6-fluoro-9α-bromo-16-methylene-Δ⁴,⁶-pregnadiene-17α,21-diol-3,11,20-trione 21-acetate 6-fluoro-9α-bromo-16-methylene-Δ¹,⁴,⁶-pregnatriene-17α,21-diol-3,11,20-trione 21-propionate Many of the reactions shown above illustrate the process of the invention as applied to 21-esters. In the application of the process of this invention, it is preferred to use esters, except for the microbiological conversion. The free 21-alcohols of all of the new compounds of this invention are also useful and it is intended to include them within the scope of the invention. They may be used in purification procedures. For example, if an impure ester product is obtained in a reaction, it may be hydrolyzed under standard conditions, isolated and reacylated to provide the original ester or a new one in a more pure form.

What is claimed is:

1. A compound selected from the group consisting of compounds having the formulas

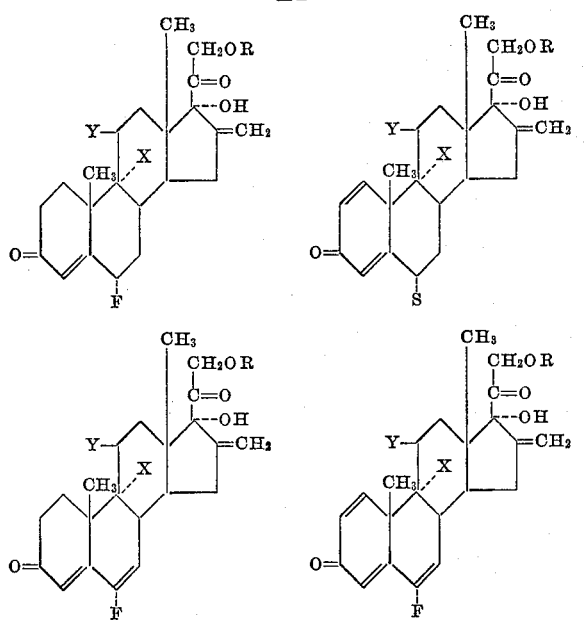

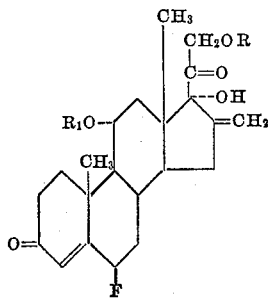

wherein X is selected from the group consisting of hydrogen, bromine and fluorine, Y is selected from the group consisting of keto and β-hydroxyl and R is selected from the group consisting of hydrogen and acyl hydrocarbon containing only carbon, hydrogen and oxygen up to a total of ten carbon atoms.

2. A compound selected from the group consisting of compounds having the formula

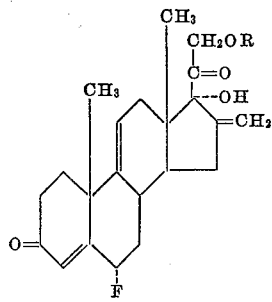

wherein R is selected from the group consisting of hydrogen and acyl hydrocarbon containing only carbon, hydrogen and oxygen up to a total of ten carbon atoms and $R_1$ is selected from the group consisting of hydrogen, mesyl and tosyl.

3. A compound selected from the group consisting of these having the formula

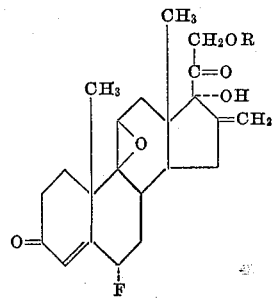

wherein R is selected from the group consisting of hydrogen and acyl hydrocarbon containing only carbon, hydrogen and oxygen up to a total of ten carbon atoms.

4. A compound selected from the group consisting of those having the formula wherein R is selected from the group consisting of hydrogen and acyl hydrocarbon containing only carbon, hydrogen, and oxygen up to a total of ten carbon atoms.

References Cited in the file of this patent

UNITED STATES PATENTS

| | | |
|---|---|---|
| 2,658,023 | Shull et al. | Nov. 3, 1953 |
| 2,659,743 | Murray et al. | Nov. 17, 1953 |
| 2,867,635 | Lincoln et al. | Jan. 6, 1959 |
| 2,892,850 | Fried et al. | June 30, 1959 |